A. T. DORA.
Hay Rake and Loader.
No. 198,281. Patented Dec 18, 1877.
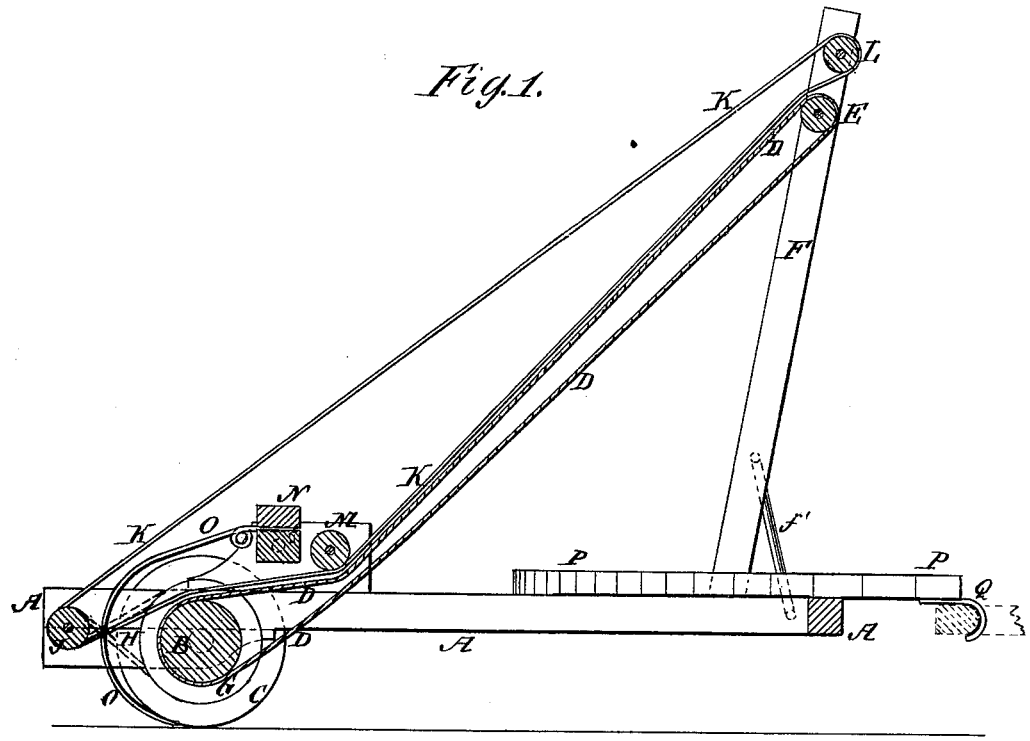
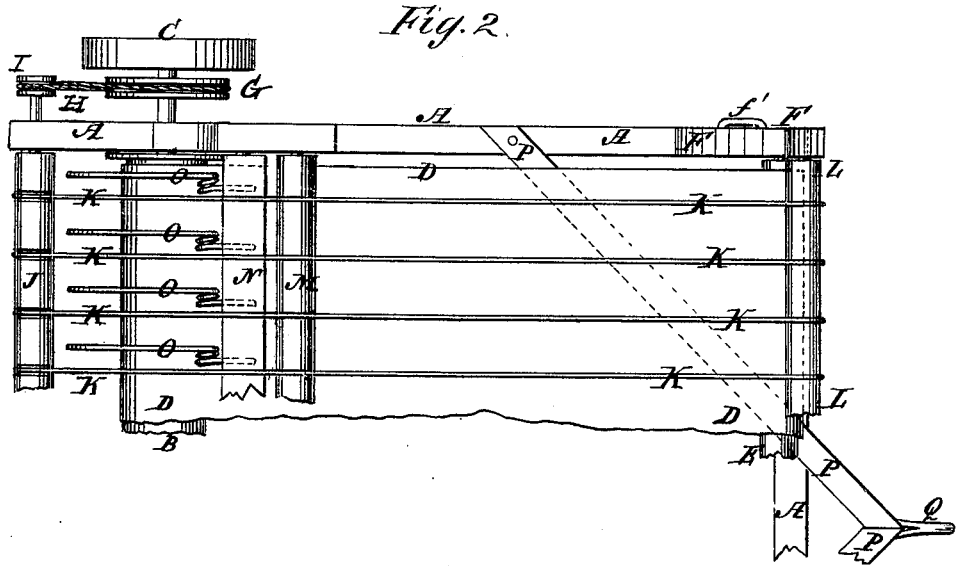
WITNESSES:
E. Wolff
J. H. Scarborough
INVENTOR:
A. T. Dora
BY Munn & Co
ATTORNEYS.

UNITED STATES PATENT OFFICE.

ALVIN T. DORA, OF CHARITON, IOWA.

IMPROVEMENT IN HAY RAKE AND LOADER.

Specification forming part of Letters Patent No. 198,281, dated December 18, 1877; application filed September 1, 1877.

*To all whom it may concern:*

Be it known that I, ALVIN TRUETT DORA, of Chariton, in the county of Lucas and State of Iowa, have invented a new and useful Improvement in Combined Hay Rake and Loader, of which the following is a specification:

Figure 1 is a vertical longitudinal section of my improved machine, and Fig. 2 is a top view of a part of the same.

Similar letters of reference indicate corresponding parts.

The object of this invention is to furnish a machine to be attached to the rear end of a hay-rack, or to the rear axle of a wagon, which shall be so constructed as to collect the hay and deposit it upon the hay-rack without allowing it to be scattered by the wind, and which shall be simple in construction and reliable and effective in use.

The invention consists in the combination of the bands and their rollers with the endless apron and its rollers, the rake, the wheels, the band and pulleys, and the frame-work, as hereinafter fully described.

A is the base-frame, which consists of two side bars, connected at their forward ends by a cross-bar. B is a roller, the journals of which revolve in bearings attached to the side bars of the frame A, near their rear ends. To the journals of the roller B are attached the wheels C. Around the roller B passes an endless apron, D, which also passes around a roller, E, pivoted to the upper parts of the posts F. The lower ends of the posts F are attached to the forward parts of the side bars of the frame A, the connection being strengthened by braces *f'*. To one of the journals of the roller B is attached a pulley, G, around which passes a band, H. The band H is crossed, and passes around a smaller pulley, I, attached to a journal of the roller J, which is pivoted to the rear ends of the side bars of the frame A, and around which passes a number of bands, K, which also pass around the roller L, pivoted to the upper ends of the posts F. The lower parts of the bands K pass around a roller, M, pivoted to bearings attached to the side bars of the frame A, so as to hold the said lower parts of the bands K near the endless apron D, and hold them parallel with the said endless apron. To bearings attached to the side bars of the frame A are attached the ends of the cross-bar N, to which the rake-teeth O are attached. To the side bars and the cross-bar of the frame A are attached the inclined draw-bars P, the forward ends of which meet at an angle, and have a hook, Q, attached to them, to be hooked upon the rear end of the hay-rack, or into an eye-bolt attached to said rack or to the rear axle of the wagon.

By this construction, as the machine is drawn forward, the hay is collected by the rake N O, is carried up by and between the bands K and the endless apron D, and is dropped upon the hay-rack, the bands K keeping the hay from being scattered, and causing it to be carried up regularly.

Having thus described my invention, I claim as new and desire to secure by Letters Patent—

The combination of the bands K and the rollers J L M with the endless apron D, the rollers B E, the rake N O, the wheels C, the band and pulleys H G I, and the frame-work A F P, substantially as herein shown and described.

ALVIN TRUETT DORA.

Witnesses:
NELSON B. GARDNER,
BENJ. F. DORA.